(12) United States Patent
Talsma

(10) Patent No.: US 8,181,771 B2
(45) Date of Patent: May 22, 2012

(54) POSITIVE-DRIVE SPIRAL CONVEYOR

(75) Inventor: Casper Fedde Talsma, Valencia (ES)

(73) Assignee: Laitram, L.L.C., Harahan, LA (US)

( * ) Notice: Subject to any disclaimer, the term of this patent is extended or adjusted under 35 U.S.C. 154(b) by 98 days.

(21) Appl. No.: 12/834,314

(22) Filed: Jul. 12, 2010

(65) Prior Publication Data

US 2012/0006654 A1   Jan. 12, 2012

(51) Int. Cl.
*B65G 21/18* (2006.01)

(52) U.S. Cl. .................. 198/778; 198/852; 198/835

(58) Field of Classification Search .............. 198/778, 198/852, 831, 835
See application file for complete search history.

(56) References Cited

U.S. PATENT DOCUMENTS

| 3,315,492 | A | * | 4/1967 | Dreksler ................... 62/381 |
| 3,348,659 | A | | 10/1967 | Roinestad |
| 3,664,487 | A | | 5/1972 | Ballenger |
| 4,036,352 | A | | 7/1977 | White |
| 4,118,181 | A | | 10/1978 | Onodera |
| 4,450,953 | A | | 5/1984 | LeCann et al. |
| 4,741,430 | A | | 5/1988 | Roinestad |
| 4,981,208 | A | * | 1/1991 | Jones ........................ 198/778 |
| 5,069,330 | A | | 12/1991 | Palmaer et al. |
| 5,133,449 | A | * | 7/1992 | Spangler ................... 198/778 |
| 5,139,135 | A | * | 8/1992 | Irwin et al. ................ 198/852 |
| 5,310,045 | A | | 5/1994 | Palmaer et al. |
| 6,484,379 | B2 | | 11/2002 | Palmaer |
| 2009/0038916 | A1 | | 2/2009 | Van Faasen |
| 2011/0056806 | A1 | | 3/2011 | Johnson |

FOREIGN PATENT DOCUMENTS

EP   1281641 A1   5/2003

OTHER PUBLICATIONS

International Search Report and Written Opinion of the International Searching Authority in International patent Application No. PCT/US11/43352, mailed Oct. 20, 2011, European Patent Office, Rijswijk, NL.

* cited by examiner

*Primary Examiner* — Mark A Deuble
(74) *Attorney, Agent, or Firm* — James T. Cronvich

(57) ABSTRACT

A spiral conveyor for positively driving a conveyor belt along a helical path. The spiral conveyor includes a rotating cylindrical tower with parallel drive members extending from the bottom to the top of the tower on its periphery. Each drive member includes an outwardly protruding ridge that varies in height from the bottom to the top of the tower. The variations in height facilitate the belt's entry onto and exit from the tower and robust, positive driving engagement with the inside edge of the belt along the majority of its path along the tower.

10 Claims, 3 Drawing Sheets

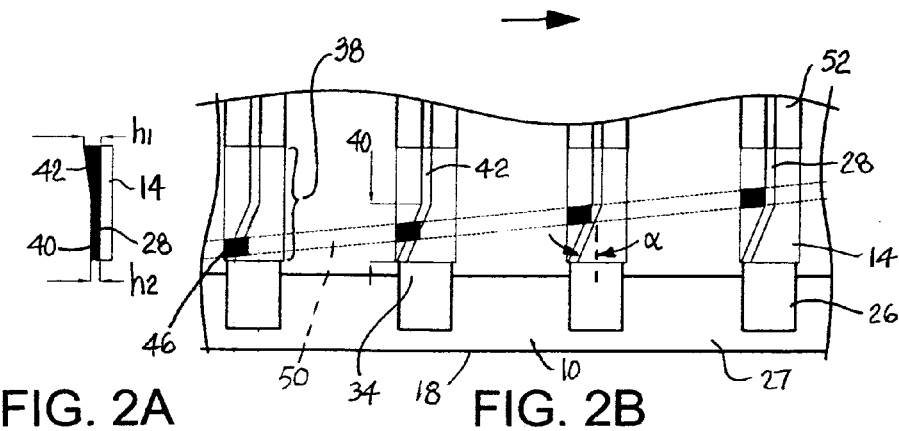
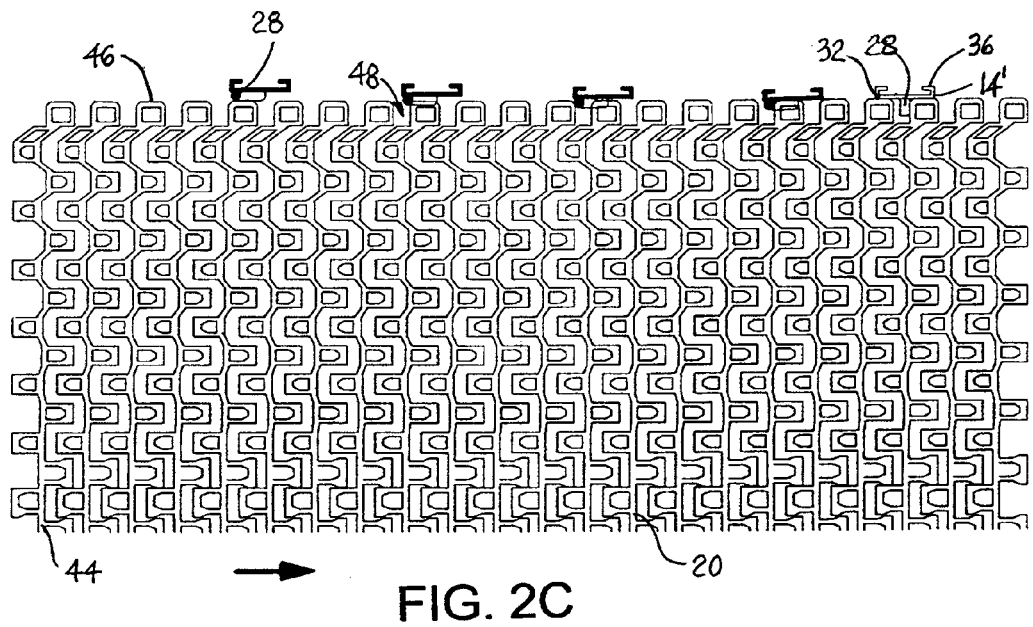

POSITIVE-DRIVE SPIRAL CONVEYOR

BACKGROUND

The invention relates generally to power-driven conveyors and more particularly to spiral conveyors in which a conveyor belt is positively driven in a helical path around a rotating drive tower.

Conveyor belts are often used to convey articles, such as food stuffs and other materials, through cooled or heated environments. Spiral conveyors, in which a conveyor belt follows a helical path winding around a central tower, drum, or cage, are used in freezers and ovens to provide a long conveying path with a small footprint.

Some helical conveyors are constructed with a helical track supported on a central non-rotating tower. The conveyor belt is driven around the helical track by drive sprockets at a single location outside the helical path. The maximum tension in the belt, which occurs just ahead of its engagement with the drive sprockets, can be quite high for such a long belt. To reduce the maximum belt tension, overdrive spiral conveyor systems are used. In these overdrive systems, the conveyor belt is driven by frictional contact between the inside edge of the belt and the faster-rotating outer surface of the rotating drum about which the belt is helically wrapped. Because the belt is driven along the entire helical path, the maximum belt tension is decreased. But some tension is still needed for effective frictional engagement between the drum and the belt edge. Furthermore, the frictional engagement causes wear in the belt edge and the outer drum surfaces. Because a large portion of the rotational energy required to drive the drum is lost to friction, the motor and power requirements can be quite high. And, because overdrive systems are sensitive to friction between the outside of the drum and the inside edge of the belt, the proper settings of tension and overdrive vary from installation to installation.

Positively driven spiral systems, in which drive structure on the outside of a rotating cage engages structure on the inside of a conveyor belt, have been used to overcome some of the shortcomings of overdrive systems. Because there is positive engagement between regularly spaced drive structure on the cage and regularly spaced edge structure on the inside edge of the belt, there is no slip as in overdrive systems. No additional tensioning is needed and frictional losses are less. But one problem with positively driven spiral systems is in cleanly engaging the belt with and disengaging it from the drive structure on the cage.

SUMMARY

Some or all of these shortcomings may be overcome by a spiral conveyor embodying features of the invention. One version comprises a rotating cylindrical drive tower that extends from a bottom to a top. Parallel drive members extend in length from the bottom to the top of the drive tower. Each of the drive members has an outwardly projecting ridge that varies in height from the bottom to the top of the drive tower. A conveyor belt is positively driven on a helical path around the drive tower by the ridges of the drive members engaging the inside edge of the belt.

BRIEF DESCRIPTION OF THE DRAWINGS

These features of the invention, as well as its advantages, are better understood by referring to the following description, appended claims, and accompanying drawings, in which:

FIGS. 2A and 2B are profile and head-on views of a lower segment of the drive members of the drive tower of FIG. 1; and FIG. 2C is a top plan view of the spiral conveyor belt entering the lower segment of the drive members of the drive tower of FIG. 1;

DETAILED DESCRIPTION

Figure 1:
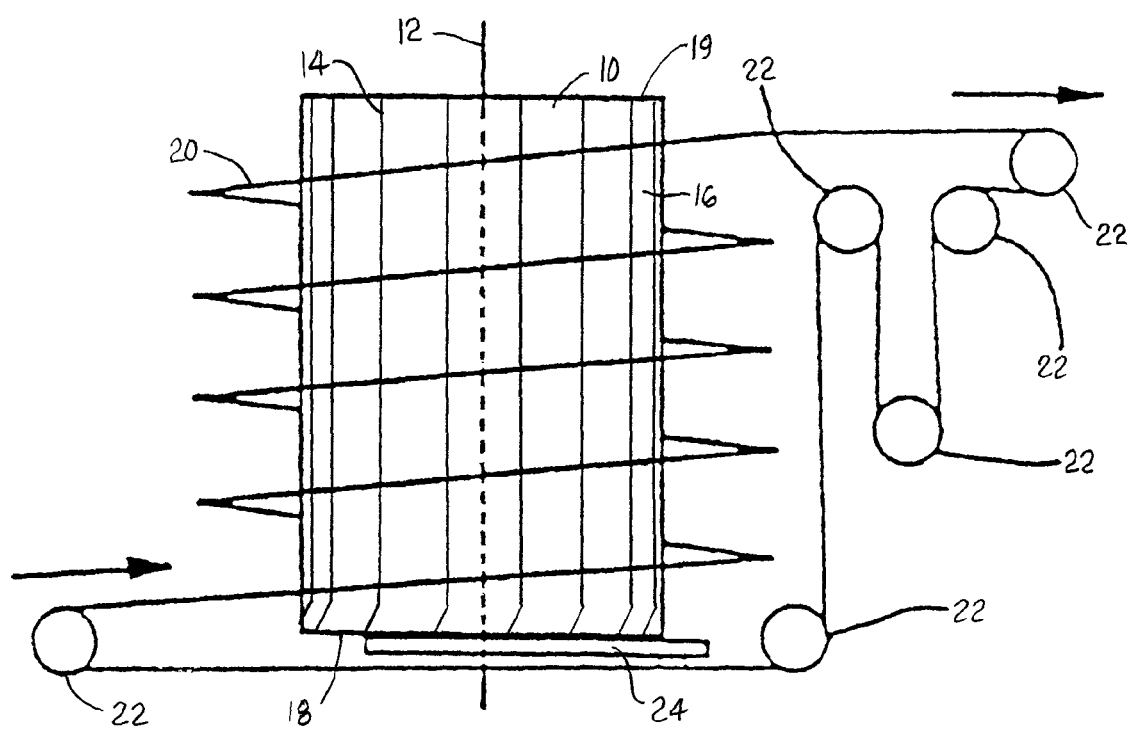
FIG. 1 is a side elevation schematic of a spiral conveyor system embodying features of the invention.

A spiral conveyor is shown schematically in FIG. 1. The spiral conveyor includes a drive tower 10 in the form of a cylindrical drum or cage that is driven to rotate about a vertical axis 12. The rotating tower has a plurality of parallel, substantially vertical drive members 14 spaced apart regularly around its periphery 16. Each drive member extends in length between the bottom 18 and the top 19 of the tower. The conveyor belt 20 follows a multi-tiered helical path around the tower. The path is defined by a helical carryway or by a carryway at the bottom and stacker plates mounted on the belt. The inside edge of the belt positively engages the drive members, which drive the belt up the tower as it rotates. The belt travels around various take-up, idle, and feed sprockets 22 as it makes it way from the exit at the top of the tower back to the entrance at the bottom. The tower 10 is mounted at its bottom to a base 24 and is rotated by a motor and gears (not shown).

Each of the drive members 14 comprises a generally vertical rail 26, which is affixed at the bottom 18 to a lower ring 27 of the drive tower 10, and a ridge 28 that protrudes outward of the rail, as shown in FIGS. 2A and 2B. The ridge is shown formed on an overlay 32 that covers the outer face 34 of the rail along just about all its length. As shown in FIG. 2C, tabs 36 hold the overlay to the rail. Instead of being formed on an overlay, the ridge could be welded directly onto the rail or formed monolithically with it.

In a lower segment 38 of each drive member, the ridge 28 includes a constant-height region 40 and a tapered region 42. A constant-height region begins at the bottom of the rail and extends upward to the tapered region. The height of the ridge 28 increases from a height $h_2$ in the constant-height region to a maximum height $h_1$ at the upper end of the tapered region. The constant-height region of the lower segment 38 is angled off vertical relative to a radial plane of the drive tower by an angle $\alpha$.

The off-vertical orientation and the low height $h_2$ of the ridge in the bottom portion of the lower segment of the drive tower facilitate the entry of the conveyor belt 20 onto the rotating tower, as shown in FIGS. 2B and 2C. The conveyor belt 20 is shown as a modular plastic conveyor belt constructed of a series of rows of belt modules 44 conventionally interconnected row-to-row by hinge rods (not shown). As the belt advances tangentially in to the rotating tower 10, one of its inside edges 46 may contact one of the ridges 28. As the belt is directed more closely toward the drive tower, the ridge eventually slides off the inside edge and into a gap 48 between adjacent belt rows. The angled orientation of the ridge in the lower segment helps guide the belt into proper engagement as it rides along its inclined helical path 50. By the time the belt reaches the tapered region 42 of the lower segment 38 of the drive members, the ridge has assumed a position just upstream of the inside edge of a belt row. In this position, the driving member is engaged with the inside edge of the belt to positively drive it along the helical path 50 without slip. In the tapered region 42, the ridge gradually increases in height to its maximum height $h_1$. The gradual increase further aids in the transition of the belt into full positive engagement with the rotating tower, as indicated by the max-height drive member 14'.

Figures 3A, 3B:
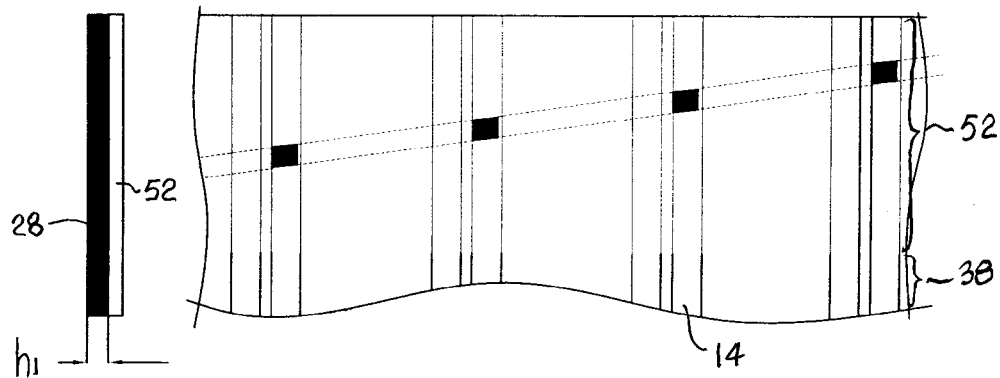
FIGS. 3A and 3B are profile and head-on views of an intermediate segment of the drive members of the drive tower of FIG. 1.
Figures 4A, 4B:
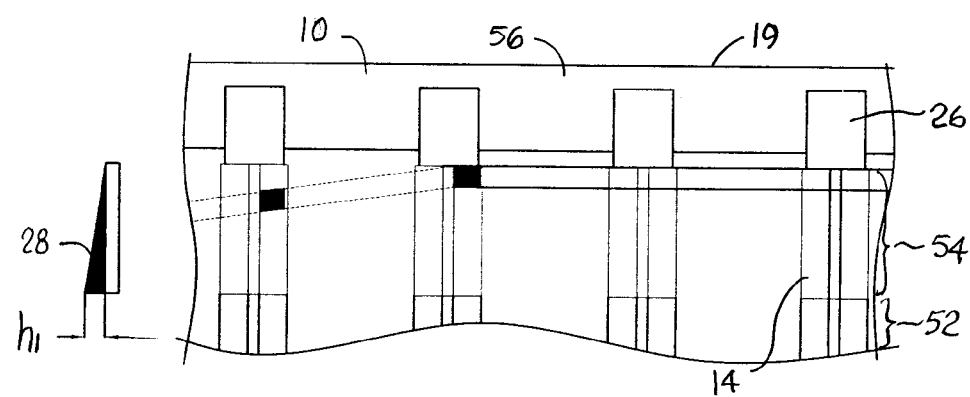
FIGS. 4A and 4B are profile and head-on views of an upper segment of the drive members of the drive tower of FIG. 1.

The ridge 28 extends out to the maximum height $h_1$ in an intermediate segment 52 of each drive member 14. The intermediate segment is disposed on the periphery of the drive tower just above the lower segment 38, as shown in FIGS. 3A and 3B. The intermediate segment constitutes the majority of the height of the tower and, consequently, provides most of the driving engagement with the conveyor belt. Just ahead of the belt's exit from the top 19 of the tower 10, the height of the ridge tapers from the maximum height $h_1$ to zero at the top, as shown in FIGS. 4A and 4B. The tapering occurs in an upper segment 54 of each drive member 14. The top of each rail is affixed to an upper rim 56. The decreasing height of the ridge 28 in the upper segment allows the belt to disengage gradually and neatly from the drive members of the rotating tower.

Thus, the spiral conveyor positively drives a conveyor belt without overdrive along a helical path with drive members that engage the inside edge of the belt with a ridge that varies in height from the bottom to the top of the rotating spiral drive tower.

Although the invention has been described in detail with reference to one version, other versions are possible. For example, the conveyor belt could be driven down the tower instead of up. In that case, the features of the lower segment and the upper segment of the drive members would be interchanged to accommodate top entry and bottom exit. As another example, the conveyor belt could be any sideflexing belt that has regularly spaced structural elements in its inside edge that could be engaged by the vertical ridge. This includes wire belts and non-plastic modular belts. So, as these few examples suggest, the scope of the claims is not meant to be limited to the specific version described in detail.

What is claimed is:

1. A spiral conveyor comprising:
    a rotating cylindrical drive tower extending from a bottom to a top;
    a plurality of parallel drive members extending in length from the bottom to the top of the drive tower;
    wherein each of the drive members includes an outwardly projecting ridge that varies in height from the bottom to the top of the drive tower;
    wherein each drive member includes a lower segment at the bottom of the drive tower and wherein the ridge extends vertically in a radial plane of the drive tower above the lower segment and is angled relative to the radial plane of the drive tower in the lower segment.

2. A spiral conveyor as in claim 1 wherein the ridge has a constant height along a majority of the length of the drive member.

3. A spiral conveyor as in claim 1 wherein each drive member includes an upper segment at the top of the drive tower wherein the ridge in the upper segment tapers down toward the top of the drive tower.

4. A spiral conveyor as in claim 3 wherein the ridge tapers linearly in the upper segment.

5. A spiral conveyor as in claim 1 wherein each drive member includes a lower segment at the bottom of the drive tower and wherein the ridge in the lower segment is tapered along a portion of its length.

6. A spiral conveyor as in claim 5 wherein the ridge in the lower segment is constant in height below the portion that is tapered.

7. A spiral conveyor as in claim 1 further comprising a conveyor belt positively driven on a helical path around the drive tower by the ridges of the drive members engaging an inside edge of the conveyor belt.

8. A spiral conveyor comprising:
    a rotating cylindrical drive tower extending from a bottom to a top;
    a plurality of parallel drive members extending in length from the bottom to the top of the drive tower;
    wherein each of the drive members includes an outwardly projecting ridge that varies in height from the bottom to the top of the drive tower;
    wherein the ridge is continuous in length with a lower segment and an upper segment connected by an intermediate segment and wherein the ridge in the intermediate segment is constant in height, the ridge in the upper segment decreases in height toward the top of the drive tower from the constant height to zero, and the ridge in the lower segment decreases in height toward the bottom of the drive tower from the constant height to a lesser height.

9. A spiral conveyor comprising:
    a rotating cylindrical drive tower extending from a bottom to a top;
    a plurality of parallel drive members extending in length from the bottom to the top of the drive tower;
    wherein each of the drive members includes an outwardly projecting ridge that varies in height from the bottom to the top of the drive tower;
    wherein the ridge has a profile from bottom to top that is constant at a first height, then increasing to a greater second height, then constant at the second height, and finally decreasing in height to the top of the drive tower.

10. A spiral conveyor as in claim 9 wherein the ridge at the bottom of the drive tower where its profile is constant at the first height is angled relative to a radial plane of the drive tower.

* * * * *